United States Patent [19]
Melchior

[11] Patent Number: 5,305,684
[45] Date of Patent: Apr. 26, 1994

[54] PISTON FOR INTERNAL COMBUSTION ENGINES AND LIKE MACHINES

[76] Inventor: Jean F. Melchior, 126 Bld du Montparnasse, 75 014 Paris, France

[21] Appl. No.: 989,497

[22] Filed: Dec. 10, 1992

Related U.S. Application Data

[63] Continuation of Ser. No. 679,234, Apr. 2, 1991, abandoned.

[30] Foreign Application Priority Data

Apr. 6, 1990 [FR] France ................................ 90 04477

[51] Int. Cl.⁵ .......................... F16J 1/14; F01B 31/00
[52] U.S. Cl. ...................................... 92/187; 92/221; 92/256
[58] Field of Search ................. 92/153, 156, 157, 187, 92/255, 256, 191, 220, 221; 123/193.6

[56] References Cited

U.S. PATENT DOCUMENTS

| | | | |
|---|---|---|---|
| 1,637,765 | 8/1927 | Comstock | 92/157 |
| 1,763,625 | 6/1930 | Mellor | 92/157 |
| 2,317,004 | 4/1943 | Wallgren et al. | 92/153 |
| 3,056,358 | 10/1962 | Pedersen et al. | 92/157 |
| 4,531,269 | 7/1985 | LaBouff | 92/220 |
| 4,938,121 | 7/1990 | Melchior | 92/157 |

*Primary Examiner*—Edward K. Look
*Assistant Examiner*—Hoang Nguyen
*Attorney, Agent, or Firm*—Larson & Taylor

[57] ABSTRACT

A piston for a combustion engine includes an external cylindrical body having an inner cavity. In the inner cavity is a partly spherical little-end of a connecting rod and a fluidtight shell or hemispherical dome. An edge portion of the dome is annularly connected a lower part of the cylindrical body so that the shell or dome bears on the little-end along a closed circular contact line or band during rest or minimum pressure parts of the cycle of operation. Oil is supplied under pressure and through a check valve to into an interstice between the little-end and the shell above the contact line. An upper incompressible space is provided between an outer surface of the shell and the cavity. The shell is maintained taut in operation between the little-end and an annular zone by which the edge portion is connected to the lower part of the cylindrical body. The shell is sufficiently thick but resilient to ensure that the shell is capable 1) of transmitting to the little-end the forces exerted by the working gas on the piston through the annular zone, and 2) of deforming under a tension resulting from these same forces, so that the volume of the interstice is cyclically reduced and the area of the contact band increases.

12 Claims, 3 Drawing Sheets

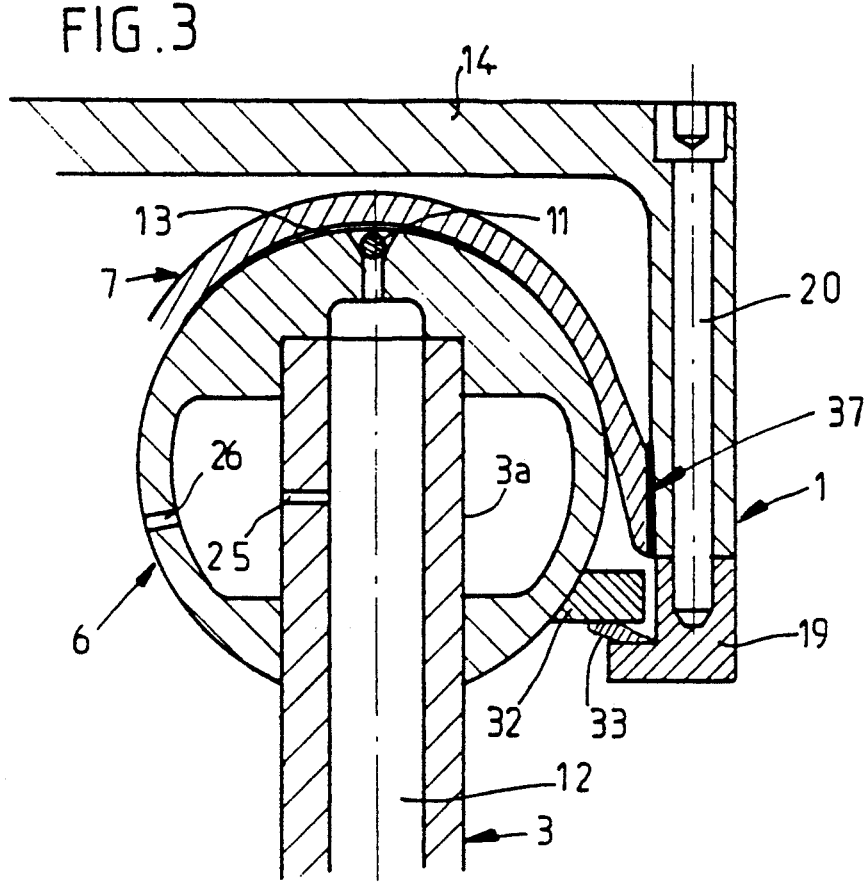
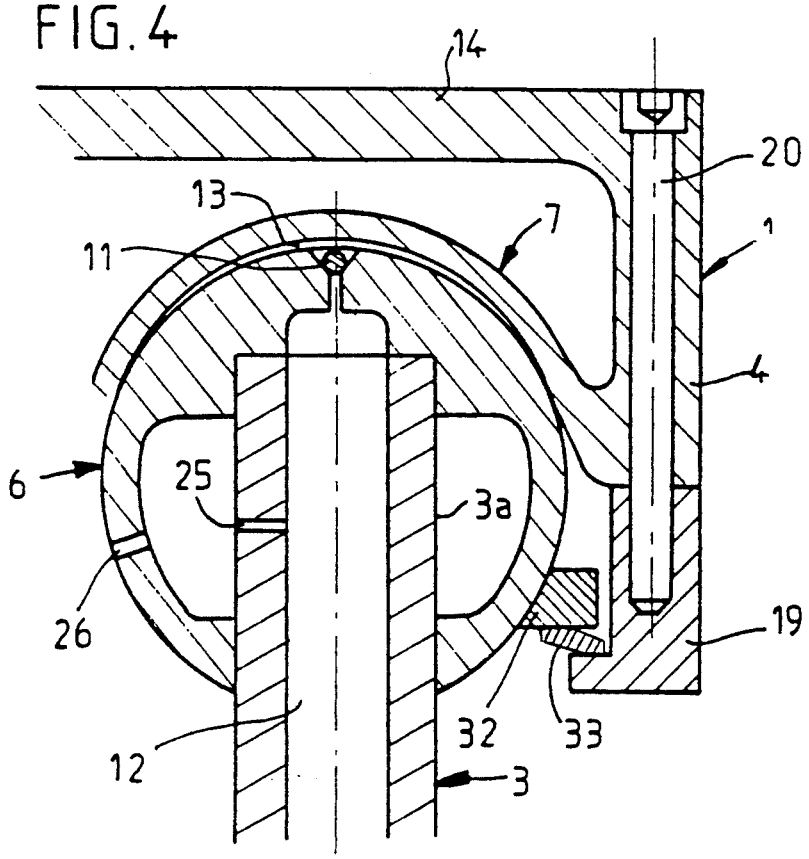

PISTON FOR INTERNAL COMBUSTION ENGINES AND LIKE MACHINES

This application is a continuation of application Ser. No. 07/679,234 filed Apr. 2, 1991, now abandoned.

The invention relates to pistons intended to slide in cylinders of reciprocating internal or external combustion engines and compressors, i.e. machines in which a working gas, contained in the or each cylinder by a transverse surface of the piston, is at both high pressure and high temperature, and it preferably, but not exclusively, concerns the pistons for two-stroke or four-stroke reciprocating internal combustion engines.

The invention more particularly relates to those of said pistons which have, inside an externally cylindrical body, an inner cavity in which are disposed the partly spherical little-end of a connecting rod and a fluidtight shell which comprises a substantially hemispherical dome and whose edge portion is rendered annularly connected to the lower part of the body of the piston, which shell is so adapted that its substantially hemispherical dome bears, when the piston is at rest or when the pressure of the working gas is minimum during the compression-expansion cycle, on the partly spherical little-end of the connecting rod, only along a contact line or band which is circular and closed and contained in, or limited in its upper part by, a plane located above the center of the little-end of the connecting rod and preferably perpendicular to the axis of the piston, which piston comprises unidirectional means for supplying lubricating oil under pressure which communicates, on the upstream side, through a check valve, with an oil passage provided in the connecting rod and opening, preferably on the axis of the connecting rod, onto an interstice defined by the parts of the surface of the little-end of the connecting rod and the surface of the shell located above said contact line or band, the pressure of the lubricating oil, on the downstream side of said check valve being higher, at least during a part of the compression-expansion cycle of the working gas, than the pressure prevailing in said interstice, the space located between the little-end of the connecting rod and the shell, below said contact line or band, communicating with a discharge zone at relatively low pressure lower than the maximum pressure prevailing in said interstice.

In this context, when expressions of positions such as "upper", "lower", "above" or "below" are employed, it is assumed that the piston is so oriented that its axis is vertical and the connecting rod is located below this piston. This hypothesis is merely intended to simplify the description and therefore does not imply that the piston is in fact oriented in this way when it is mounted in an internal or external combustion engine or in a compressor.

A piston such as that defined hereinbefore is described in the document EP-A-0 280 622 or U.S. Pat. No. 4,938,121 with respect to FIGS. 8 and 11 of the latter. In this known construction, the shell is a thin preferably bronze metal shell which is so arranged that its dome operates substantially only under compression in a direction perpendicular to its surface and whose sole function is to contribute to the sealing of the space which is defined inside said cavity by that one of the surfaces of the dome of the shell which is remote from the little-end of the connecting rod, which space is filled with a viscous or pasty or plastically deformable fluid buffer which is substantially incompressible at the operating temperatures and pressures of the piston. For this purpose, the shell comprises a cylindrical portion which is axially movable in contact with an inner cylindrical bearing surface of the piston and there therefore exists at rest, between the edge portion of the shell which is fixed to the inner wall of the piston and the remainder of the shell, a clearance which enables the shell to deform in proximity to said edge portion without being subjected to tensile forces in this region. The forces exerted in operation by the working gas on the transverse surface of the piston are indeed transmitted to the partly spherical little-end of the connecting rod through said fluid buffer, without intervention on the part of the shell.

Apart from undeniable advantages, this known piston has the following drawbacks:

assembling difficulties owing in particular to the fact that the fluid buffer usually has a thermal expansion coefficient different from that of the metal parts present, which renders a sufficient control of the volume of the fluid difficult;

a delay, owing to the viscosity of the fluid, in the transitional stage, in the transmission of the pressure force which varies in amplitude (variation in the pressure exerted by the working gas) and in direction (angulation of the connecting rod), which is liable to cause, in the hydrostatic distribution of the pressure over the shell, defects in homogeneity which may create shear stresses in the latter which result in fatigue and fracture of the shell.

An object of the invention is to overcome these drawbacks by arranging that the shell operates in a novel and original manner.

To this end, the piston according to the invention is characterized in that the space which is limited within said cavity by that one of the surfaces of the shell which is remote from the little-end of the connecting rod is so arranged that no appreciable hydrostatic pressure can develop therein, in the course of operation, owing to the deformation of the shell; the shell is maintained taut in operation between the partly spherical little-end of the connecting rod and the annular zone by which its edge portion is connected to the lower part of the body of the piston, and the shell is made from a metal or like resilient material with a thickness which is sufficient to ensure that this shell is capable of transmitting to the partly spherical little-end of the connecting rod the forces exerted in operation by the working gas on said transverse surface of the piston and received by the shell through its annular connection zone, the shell being however sufficiently thin to be resiliently deformed under the effect of the tension resulting from the forces due to the pressure of the working gas exerted cyclically on the transverse surface of the piston and transmitted to the connecting rod through said shell so as to cyclically reduce the volume of said interstice and preferably cyclically increase the area of the contact band, the minimum and maximum limits imposed on the thickness of the shell being such that the material from which the shell is made under no circumstance exceeds its fatigue limit.

In this way the shell is made to perform no longer a simple sealing function, as in the piston according to the document EP-A-0 280 622 or U.S. Pat. No. 4,938,121, but a force-transmitting function by making it operate essentially no longer under compression but under tension, with elimination of the fluid cushion which constitutes an essential element of the piston according to said document.

As defined hereinbefore, the limits between which the thickness of the shell must be chosen permit one skilled in the art to determine this thickness as a function of the nature of the material from which the shell is made. The lower limit enables the shell to perform the function of a diaphragm of a pump which permits maintaining in operation, between the little-end of the connecting rod and the shell, a film of oil which prevents any direct contact between these two elements which must pivot relative to each other in the course of each cycle. At rest, an interstice filled with oil subsists, which permits re-priming this pump as soon as the engine starts up.

The invention will now be described in more detail with the aid of the accompanying drawings.

FIG. 1 of these drawings is a diagrammatic axial sectional view of the assembly of a piston according to the invention and the corresponding connecting rod;

FIGS. 3 and 4 are views of variants of FIG. 2, and

Figure 1:
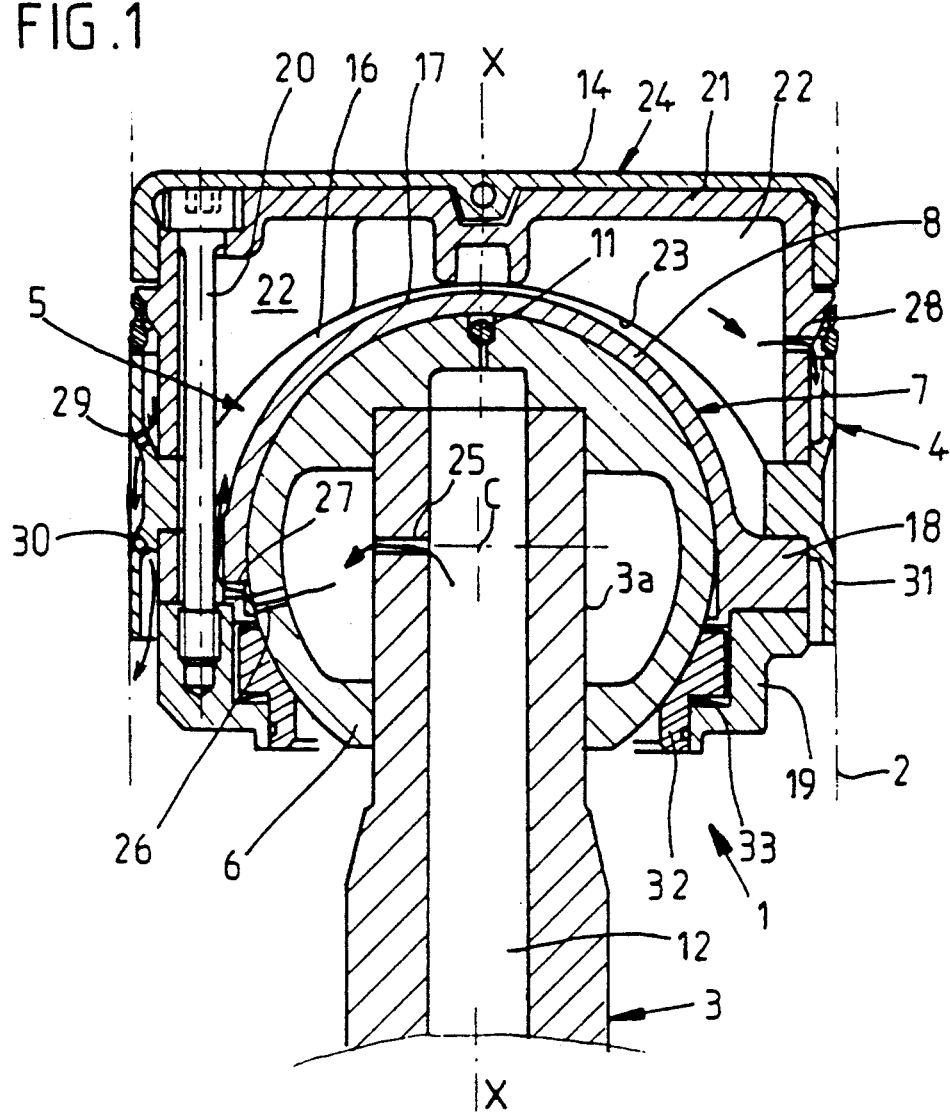

As diagrammatically represented in FIG. 1, the invention provides a piston 1 adapted to slide in a cylinder 2 and connected to a connecting rod 3. Inside an externally cylindrical body 4 having an axis X—X (the expression "cylindrical" is not intended to exclude the presence of grooves for piston rings or the like or a certain camber on the body), the body 4 defines an inner cavity 5 where there are located the partly spherical little-end 6 of the connecting rod 3 and a fluidtight shell 7, i.e. a non-apertured and non-permeable shell. This shell 7 comprises a substantially hemispherical dome 8 and its edge portion is rendered annularly connected to the lower part of the body 4 of the piston 1 in a manner which will be explained in detail hereinafter. The little-end 6 is preferably a drive fit on the cylindrical end portion 3a of the connecting rod.

The shell 7 is so arranged that its dome 8 bears against the partly spherical little-end 6, when the piston is at rest or the pressure of the working gas is minimum in the course of the compression-expansion cycle, only along a closed circular contact line 9 (FIG. 2) contained in a plane P located above the center C of the little-end 6 or a closed circular contact band 10 limited in its upper part by this plane P. The plane P is preferably perpendicular to the axis X—X. In operation, there is established in all cases a contact band 10 whose area varies cyclically.

The piston 1 comprises unidirectional means for supplying lubricating oil under pressure which communicate, on the upstream side, through a check valve 11, with an oil passage 12 provided in the connecting rod 3 and extending through the little-end 6 and opening into, preferably on the axis of the connecting rod 3, an interstice or meniscus 13 defined by the parts of the little-end 6 and the shell 7 located above the contact line 9 or band 10. At least during a part of the compression-expansion cycle of the working gas which acts within the cylinder 2 on the transverse surface 14 of the piston 1 remote from the connecting rod 3, the pressure of the lubricating oil, on the upstream side of the check valve 11, is higher than the pressure prevailing in the interstice 13. The space 15 located between the little-end 6 of the connecting rod and the shell 7, below the contact line 9 or band 10, communicates with a discharge zone at relatively low pressure lower than the pressure prevailing in the interstice 13.

According to the invention:

the space 16 defined inside the cavity 5 by that one of the surfaces of the shell 7 remote from the connecting rod little-end 6, i.e. by the upper surface 17 of the shell 7, is so arranged that no appreciable hydrostatic pressure can develop therein in the course of operation owing to deformation of the shell 7;

the shell 7 is maintained taut in operation between the little-end 6 and the annular zone by which the edge portion of the shell 7 is connected to the inner wall of the body 4, and the shell 7 is made from a metal or other resilient material, in particular steel, and has a thickness e sufficient to ensure that this shell 7 is capable of transmitting to the little-end 6 the forces exerted in operation by the working gas on the transverse surface 14 and received by the shell 7 through its annular connection zone. The thickness e of the shell 7 is, however, small enough (at least in the part of its dome 8 defined by the contact line 9 or band 10) to be capable of resiliently deforming under the effect of the tension resulting from the forces due to the pressure of the working gas exerted cyclically on the transverse surface 14 and transmitted to the connecting rod 3 through the shell 7. Instead of being of metal, in particular steel, the shell 7 could be of an equivalent material such as a plastics material which may be reinforced with fibers.

The shell 7 of the invention is therefore distinguished from the shell according to said document EP-A-0 280 622 or U.S. Pat. No. 4,938,121 by the nature of the material from which it is made (metal or other resilient material such as steel, instead of bronze); by its thickness (which is sufficient to resist the tensile forces developed in operation whereas the known shell is thin since it does not have to be subjected to such forces); and by the fact that it is maintained taut in operation (whereas the known shell is free to move in contact with the inner cylindrical surface of the body of the piston). The minimum and maximum limits imposed on the thickness of the shell 7 are in any case such that the material of said shell must in no circumstance exceed its fatigue limit and even afford a certain margin of safety.

Although it is possible to fix the edge portion of the shell 7 to the lower part of the piston body 4 by pinching a flange 18 constituting an edge portion of the shell 7 and extending radially outwardly, between the piston body 4 and a ring 19 rigidly secured to the body 4 by means of assembly screws 20 parallel to the axis X—X, it will be preferable to render the shell 7 connected to the body 4 either by welding the edge portion of the shell with the lower and inner part of the body 4 as indicated at 37 in FIG. 3, or by making the body 4 and the shell 7 in one piece, preferably by precision casting, as shown diagrammatically in FIG. 4.

In order to ensure that no appreciable hydrostatic pressure can develop in the space 16 defined hereinbefore, this space 16 may be a closed space filled with a gas such as air, in particular at a pressure around atmospheric pressure. As a variant, and as shown in FIG. 1, the space 16 may be filled at least partly with lubricating oil and be connected to a discharge zone at relatively low pressure, for example to the same discharge zone as that associated with the space 15. An embodiment of the oil circuit feeding oil to the space 16 will be described in more detail hereinafter.

In the embodiment shown in FIG. 1, the inner cavity 5 of the piston body 4 is limited in its upper part by a transverse wall 21 from which extend adjoining radiating stiffening partition walls 22 which leave free therebetween compartments which are part of the space 16 and whose arched lower edges 23 are sufficiently spaced away from the surface 17 of the shell 7 not to hinder the deformations of the latter. Preferably connected to the transverse wall 21 is a refractory cap 24 which is advantageously provided with recesses (not shown in FIG. 1) reducing its area of contact with the wall 21 and thus forms a thermal barrier and defines said transverse surface 14, thereby protecting the transverse wall 21 and the heads of the screws 20.

The passage 12 feeds oil not only to the interstice 13 through the check valve 11 but also to a cooling circuit for the interface between the piston and the cylinder (or sleeve of the cylinder) through an orifice 25 provided on the upstream side of the check valve 11 and extending through the end portion 3a of the connecting rod 3 and connected to the space 16 through orifices 26 and 27 which extend through the connecting rod little-end 6 and the shell 7 respectively. The oil can escape from the space 16 through orifices 28, 29 and 30 provided in the body 4 or in an added skirt 31, to the sump of the engine at atmospheric pressure.

To form the interstice 13, the dome 8 of the shell 7 may be given a partly spherical shape at rest and the part of the little-end 6 which is capped by this dome 8 may be given a slightly flattened shape relative to a sphere. However, in order to center the forces on the axis X—X of the piston 1 irrespective of the orientation of the connecting rod 3 and limit the deformations of the dome 8, it is preferred to give the little-end 6 a shape which is as perfectly spherical as possible and the dome 8 a shape which slightly differs at rest from the perfectly spherical shape, as is clear from FIG. 2.

Figure 2:
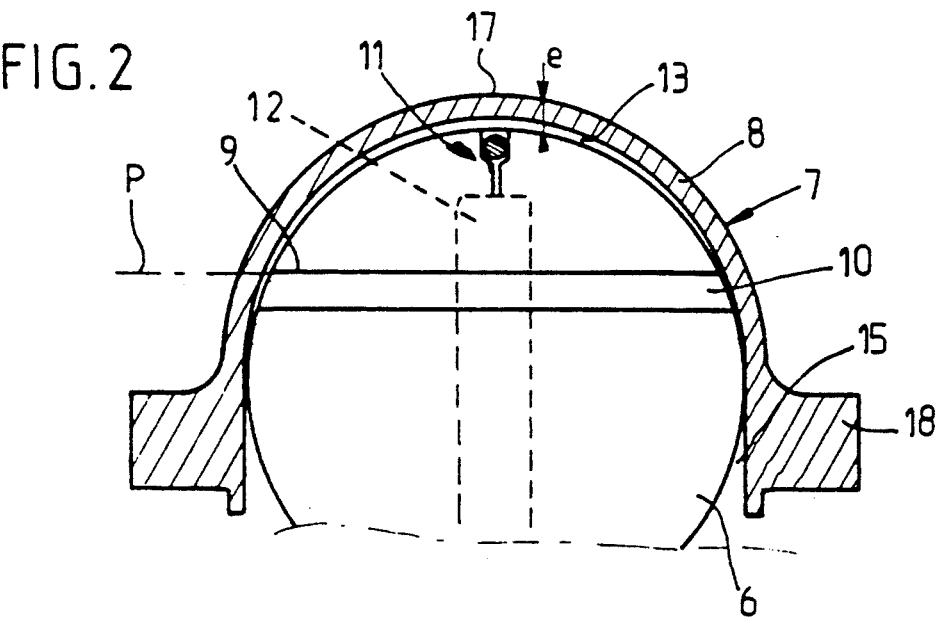
FIG. 2 is a view of the shell and the little-end of the connecting rod of FIG. 1 and illustrates how the lubricating oil is made to circulate.

In order to maintain the cohesion of the connecting rod-piston assembly, the ring 19 may also pinch a brace 32 through resilient means such as a steel washer 33 which bears against the lower part of the little-end 6. In this way it is possible to give the shell 7, in particular for pistons intended for four-stroke engines, a pre-tension which is adjustable by the height of the brace 32 which may moreover prevent the oil present between the little-end 6 and the shell 7 from directly escaping in the downward direction and in this way from short-circuiting the cooling circuit passing through the orifices 27 to 30. In the embodiments shown in FIGS. 3 and 4, there are once again found a ring 19 connected to the body 4 by screws 20 which cooperate with a brace 32 and a resilient washer 33; the sole difference between the embodiments shown in FIGS. 1 and 2 is that the ring 19 here does not serve to pinch a flange such as 18.

There is in this way provided a piston which operates in the following manner.

When the piston 1 is at rest, i.e. when no gaseous pressure is exerted on its transverse surface 14, the thick metal shell 7 is unstressed (unless there is the pre-tension which may be exerted by the resilient means or washer 33). The piston 1 bears against the little-end 6 through the shell 7 along the contact line 9 or band 10. The interstice or meniscus 13 is filled with oil.

When the pressure of the working gas is exerted on the transverse surface 14 of the piston 1, the piston body 4 transmits, by bearing against the flange 18 of the shell 7, the whole of the force due to the action of the working gas (minus the force of inertia of the piston) to the little-end 6 of the connecting rod 3 through the dome or vault 8 of the shell 7 which consequently operates essentially under tension. The application of this force in the downward direction causes:

the extension of the shell 7 which is rendered taut in the manner of a strap;

the increase in the area on which the shell 7 bears against the little-end 6 and the reduction in the volume of the meniscus 13;

the increase in the oil pressure in the meniscus 13 which closes the check valve 11 and stops the return of the oil;

consequently the expulsion of the oil which was trapped between the little-end 6 and the inner surface (remote from the surface 17) of the dome 8 of the shell 7.

It will be observed that, with this mechanism, the bearing surfaces between the little-end 6 and the shell 7 will be automatically lubricated with fresh oil which is renewed in each cycle. Indeed, when the pressure of the working gas decreases, stress on the shell 7 decreases and the meniscus 13 is reformed and causes the re-aspiration of oil through the check valve 11.

In the foregoing, it was mentioned that the space between the connecting rod little-end 6 and the shell 7 below the contact line or band 9, 10, communicated with a discharge zone at relatively low pressure. This means that the shell 7 and/or the connecting rod little-end 6 must be so arranged that the assembly of the piston 1 and little-end 6 cannot constitute a hydraulic jack or stop-pawl".

Indeed, if the flange 18 had for example an inner cylindrical part of the same diameter (without clearance) as that of the little-end 6, the pressure established in the meniscus 13 would rise without possibility of the oil escaping (since, in this hypothesis, the clearance is zero). The articulation would then operate as a hydraulic jack and the piston body 4 would gradually separate from the little end 6. If the brace 32 were in position it would oppose this axial separation between the little-end 6 and the body 4 and produce very high mechanical overloads.

Figure 5:
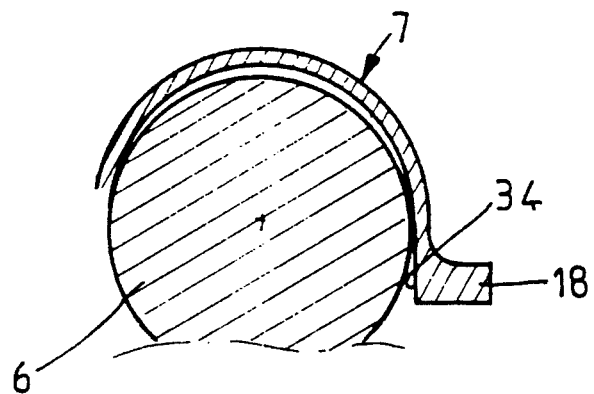
FIGS. 5 to 7 are views of various solutions for preventing the assembly of the piston and the little-end of the connecting rod from operating as a hydraulic jack.
Figure 6:
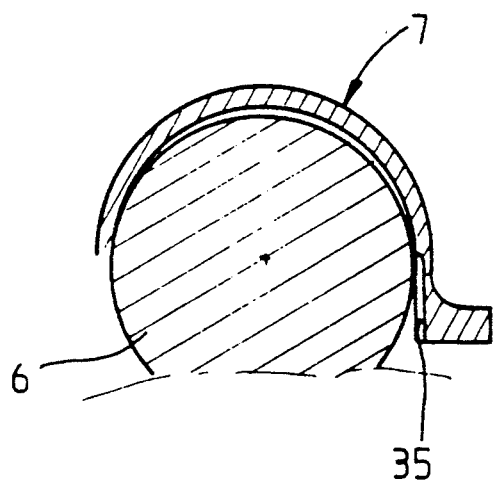
Figure 7:
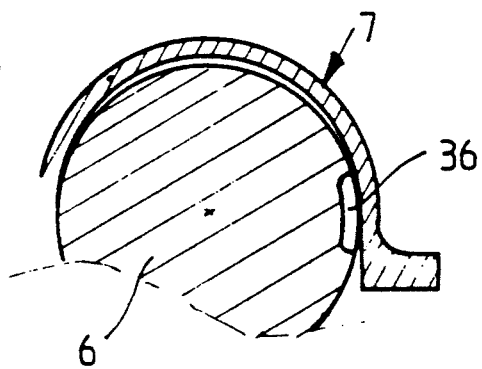

In order to eliminate this phenomenon, three solutions are diagrammatically illustrated by way of examples in FIGS. 5 to 7. In FIG. 5, the shell 7 is given, in the region of the flange 18, a downwardly divergent frustoconical inner surface 34. Alternatively, spaces are provided by grooves 35 in the shell 7 (FIG. 6) and/or by grooves 36 in the little-end 6 (FIG. 7).

As an example a piston 1 was constructed with the following features:
 diameter of the piston 1: 135 mm;
 diameter of the little-end 6: 90 mm;
 thickness of the steel dome 8: 4 mm;
 maximum height of the meniscus 13: 0.1 mm;
 maximum volume of the meniscus 13: 125 cu.mm.

A pressure of 30 MPa on such a piston weighing 5 kg and undergoing an acceleration of 300 g, exerts a force of 41,470 daN and therefore a tensile stress of 370 MPa on the shell. If the volume of the meniscus 13 is eliminated by this tensile stress, the oil flow for a three-cylinder engine operating at 1,800 rpm will be about 40 l/hour.

What is claimed is:

1. An assembly for cyclically transferring a working force of a working gas in a cylinder of a reciprocating combustion engine in which the working gas is at both high temperature and high pressure and the engine includes a lubricating oil at high pressure and an oil discharge zone at low pressure, said assembly comprising:
- a connecting rod in the oil discharge zone including a partly substantially spherical little-end, a supply passage to which the lubricating oil at high pressure is supplied, an opening from said supply passage in a distal substantially hemispherical surface of said little-end, and a check valve in said passage through which the oil flows under pressure only through said supply passage to said opening;
- a shell including a substantially hemispherical dome and an annular edge portion, said shell being made from a resilient material and with a thickness such that said dome deforms under a direct tension force resulting form the working force acting in a direction parallel to a longitudinal axis of the cylinder which is applied to said annular edge portion, and said dome having a substantially hemispherical inner surface and a substantially hemispherical outer surface and said inner surface being shaped to receive said spherical little-end therein such that said inner surface of said dome bears only against said distal surface of said little-end along a closed circular contact line or band when a pressure of the working gas is at a minimum in a course of a compression-expansion cycle of the engine whereby a fluid-tight interstice is provided between said inner surface of said dome and said distal surface of said little-end which is in communication with said opening and hence is filled with lubricating oil;
- a piston which slides in the cylinder including a transverse surface against which the working gas presses when at high pressure and an external cylindrical body having an inner cavity in which said shell and said little-end of said connecting rod are received;
- a holding means for holding said annular edge portion of said shell to a lower part of said cylindrical body with said shell held taut such that a free space devoid of any axial force-transmitting connections is provided in said cavity between said outer surface of said dome and said piston at all times and such that the working force cyclically exerted on said transverse surface of said piston by the working gas is transferred to said dome of said shell as a direct tension force only through said annular edge portion and the tension force is then transferred to said little-end with a resilient direct tensile deformation of said dome in said free space as said shell is held taut by said holding means, the resilient tensile deformation of said dome and the resultant increase in the area of said contact line or band as said dome is resiliently deformed into contact with said little end compresses the oil in said interstice to a high pressure and hence past said contact line or band to the discharge zone, and after the force is transferred and said dome resiliently moves back to the initial shape in said free space new oil is moved into said interstice through said opening of said supply passage in said little-end of said connecting rod; and
- a freeing means for preventing any hydrostatic pressure build-up in said free space of said cavity so that said shell is free to deform in said free space.

2. An assembly for cyclically transferring a force of a working gas in a cylinder of a reciprocating combustion engine in which the working gas is at both high temperature and high pressure and the engine includes a lubricating oil at high pressure and an oil discharge zone at low pressure, said assembly comprising:
- a connecting rod in the oil discharge zone including a partly substantially spherical little-end, a supply passage to which the lubricating oil at high pressure is supplied, an opening from said supply passage in a distal substantially hemispherical surface of said little-end, and a check valve in said passage through which the oil flows under pressure only through said supply passage to said opening;
- a shell including a substantially hemispherical dome and an annular edge portion, said shell being made from a resilient material and with a thickness so as to deform under a tension force resulting from a force applied to said annular edge portion, and said dome having a substantially hemispherical inner surface and a substantially hemispherical outer surface and said inner surface being shaped to receive said spherical little-end therein such that said inner surface of said dome bears only against said distal surface of said little-end along a closed circular contact line or band when a pressure of the working gas is at a minimum in a course of a compression-expansion cycle of the engine whereby a fluid-tight interstice is provided between said inner surface of said dome and said distal surface of said little-end which is in communication with said opening and hence is filled with lubricating oil;
- a piston which slides in the cylinder including a transverse surface against which the working gas presses when at high pressure and an external cylindrical body having an inner cavity in which said shell and said little-end of said connecting rod are received;
- a holding means for holding said annular edge portion of said shell to a lower part of said cylindrical body with said shell held taut such that a free space devoid of any axial force-transmitting connections is provided in said cavity between said outer surface of said dome and said piston at all times and such that the force cyclically exerted on said transverse surface of said piston by the working gas is transferred to said shell as a tension force only through said annular edge portion and the tension force is then transferred to said little-end with a resilient tensile deformation of said dome in said free space as said shell is held taut by said holding means, the resilient tensile deformation of said dome and the resultant increase in the area of said contact line or band as said dome is resiliently deformed into contact with said little end compresses the oil in said interstice to a high pressure and hence past said contact line or band to the discharge zone, and after the force is transferred and said dome resiliently moves back to the initial shape in said free space new oil is moved into said interstice through said opening of said supply passage in said little-end of said connecting rod; and
- a freeing means for preventing any hydrostatic pressure build-up in said free space of said cavity so that said shell is free to deform in said free space, wherein said freeing means includes a fluid-tight enclosure for said free space and a gas which fills said free space.

3. An assembly as claimed in claim 1 wherein said freeing means includes a connecting passage from said free space to the oil discharge zone; and further including a means for introducing lubricating oil into said free space.

4. An assembly as claimed in claim 1 wherein said holding means is a weld between said annular edge portion of said shell and said lower part of said cylindrical body of said piston.

5. An assembly as claimed in claim 1 wherein said holding means is a forming of said annular edge portion of said shell and said lower part of said cylindrical body of said piston as one piece.

6. An assembly as claimed in claim 1 wherein said annular edge portion of said shell is an annular flange, and wherein said holding means includes a ring which is rigidly secured to said cylindrical body to pinch said annular flange of said shell therebetween.

7. An assembly as claimed in claim 1 and further including a securing means for securing said little-end of said connecting rod in said inner cavity of said piston, said securing means including a brace which is in bearing relation to a proximal part of said little-end, a ring, and a resilient means for resiliently pinching said ring against said brace.

8. An assembly as claimed in claim 7 wherein said annular edge portion of said shell is an annular flange, and wherein said holding means includes said ring which is rigidly secured to said cylindrical body to pinch said annular flange therebetween.

9. An assembly as claimed in claim 1 wherein said little-end of said connecting rod is substantially perfectly spherical and said dome of said shell without any tension force exerted thereon differs slightly from a substantially perfect spherical shape.

10. An assembly for cyclically transferring a working force of a working gas in a cylinder of a reciprocating combustion engine to a crankshaft, the working gas being at both high temperature and high pressure and the engine including a lubricating oil circuit at high pressure and an oil discharge zone at low pressure, said assembly comprising:
   a piston which slides in the cylinder including a transverse surface against which the working gas presses, a body having an external cylindrical shape which cooperates with the cylinder, and an inner cavity;
   a shell made from a resilient material and including a substantially hemispherical dome at an upper part thereof, said dome having a substantially hemispherical inner surface and a substantially hemispherical outer surface, and an annular edge portion at a lower part thereof;
   a holding means for locating said dome in said cavity and for mechanically connecting said annular edge portion of said dome to said piston such that said outer surface of said dome has no direct contact with said inner cavity of said piston and a free space is delimited between said outer surface and said piston where no hydrostatic pressure build-up is possible;
   a connecting rod which connects to the crankshaft and including a partly substantially spherical little-end having a polar zone and an opening is said polar zone, a supply passage connected to said opening to which the lubricating oil circuit at high pressure is supplied, and a check valve in said passage;
   whereby said partly spherical little-end is received by said hemispherical inner surface of said dome of said shell, the hemispherical inner surface being so shaped and the thickness of said dome being thick enough that, when the pressure of the working gas is at a minimum in a course of a compression-expansion cycle, said spherical little-end of said connecting rod bears against said hemispherical inner surface of said shell only along a closed circular contact line or band so that there remains an interstice between said little-end of said connecting rod and said hemispherical inner surface above the contact line or band which is filled with oil communicated thereto through said opening, and whereby the thickness of said dome is thin enough so that when the pressure of the working gas in the cylinder is at a maximum in a course of the compression-expansion cycle of the engine, the force transmitted from the working gas to the piston and from the holding means of the piston to said annular edge of said shell, and by direct tension to said dome of said shell, compresses the oil in said interstice which cannot escape past said check valve to a high pressure which discharges the oil to the discharge zone through said contact line or band.

11. An assembly as claimed in claim 10 wherein said free space located between said piston and said outer surface of said dome of said shell is fluid-tight and filled with a gas.

12. An assembly as claimed in claim 10 wherein said free space located between said piston and said outer surface of said dome of said shell includes a connecting passage from said free space to the oil discharge zone and a means for introducing lubricating oil into said free space.

* * * * *